United States Patent
Ebata

(10) Patent No.: US 8,775,461 B2
(45) Date of Patent: Jul. 8, 2014

(54) CASE SEARCH SYSTEM, CASE DATABASE, CASE SEARCH APPARATUS, CASE SEARCH METHOD, AND PROGRAM

(75) Inventor: Koichi Ebata, Minato-ku (JP)

(73) Assignee: NEC Corporation, Tokyo (JP)

( * ) Notice: Subject to any disclaimer, the term of this patent is extended or adjusted under 35 U.S.C. 154(b) by 11 days.

(21) Appl. No.: 12/432,068

(22) Filed: Apr. 29, 2009

(65) Prior Publication Data

US 2009/0282024 A1 Nov. 12, 2009

(30) Foreign Application Priority Data

May 8, 2008 (JP) ................................. 2008-121737

(51) Int. Cl.
*G06F 7/00* (2006.01)
*G06F 17/30* (2006.01)

(52) U.S. Cl.
USPC ............................ 707/769; 707/706; 707/707

(58) Field of Classification Search
USPC .......................................... 707/706, 707, 769
See application file for complete search history.

(56) References Cited

U.S. PATENT DOCUMENTS 7,130,634 B1 * 10/2006 Clemens et al. ............... 455/446
2006/0105775 A1 * 5/2006 Von Kaenel et al. ....... 455/456.1

FOREIGN PATENT DOCUMENTS

| JP | 8-44641 A | | 2/1996 | |
|---|---|---|---|---|
| JP | 2003-114911 A | | 4/2003 | |
| JP | 2005-269238 | * | 9/2005 | ............. G06F 15/00 |
| JP | 2005-269238 A | | 9/2005 | |

* cited by examiner

*Primary Examiner* — Sherief Badawi
*Assistant Examiner* — Christy Lin
(74) *Attorney, Agent, or Firm* — Sughrue Mion, PLLC

(57) ABSTRACT

A case search system for searching for a case that serves as a reference in a design or operation of a wireless network. The case search system includes a case database in which, for a case of design or operation of a wireless network, environment information that determines environmental characteristics of a wireless network in an area associated with the case is registered, and a case search unit that searches the case database for a case which serves as a reference using, as a search key, environment information that determines environmental characteristics of a wireless network in a target area which is a subject matter of the design or operation of the wireless network.

18 Claims, 6 Drawing Sheets

Fig. 4

| SEARCH KEY | CRITERION VALUE (DIFFERENCE) |
|---|---|
| LONGITUDE/LATITUDE | 0.5° |
| BUILDING CONSTRUCTION DENSITY | 5 BUILDINGS / km$^2$ |
| BUILDING HEIGHT DISTRIBUTION (AVERAGE) | 5m |
| BUILDING HEIGHT DISTRIBUTION (VARIANCE) | 5m |
| . . . | . . . |

Fig. 5

| DATE AND TIME | ENVIRONMENT INFORMATION ||||||||| DESIGN/ OPERATION DETAILS |
| --- | --- | --- | --- | --- | --- | --- | --- | --- | --- |
| | GEOGRAPHIC NAME | POSITION INFORMATION | LAND USE CLASSIFICATION | BUILDING CONSTRUCTION DENSITY | BUILDING HEIGHT DISTRIBUTION (AVERAGE) | BUILDING HEIGHT DISTRIBUTION (VARIANCE) | DENSITY OF EXISTING BASE STATIONS | POPULATION DENSITY | DETAILS |
| 2007/3/1 15:00 | SHINJUKU | EAST LONGITUDE: 139.7° NORTH LATITUDE: 35.7° | RESIDENTIAL AREA | 15 BUILDINGS/km$^2$ | 30m | 15m$^2$ | 3 STATIONS/km$^2$ | 16,000 PEOPLE/km$^2$ | ACCOMMODATION CAPACITY INCREASE |

Fig. 6

| No | GEOGRAPHIC NAME | POSITION INFORMATION | LAND USE CLASSIFICATION | BUILDING CONSTRUCTION DENSITY | BUILDING HEIGHT DISTRIBUTION (AVERAGE) | BUILDING HEIGHT DISTRIBUTION (VARIANCE) | DENSITY OF EXISTING BASE STATIONS | POPULATION DENSITY | DATE AND TIME | DETAILS | WIRELESS SYSTEM | COST |
|---|---|---|---|---|---|---|---|---|---|---|---|---|
| 1 | SHIBUYA | EAST LONGITUDE: 139.7° NORTH LATITUDE: 35.6° | RESIDENTIAL AREA | 14 BUILDINGS/km$^2$ | 25m | 10m$^2$ | 6 STATIONS/km$^2$ | 17,000 PEOPLE/km$^2$ | 2007/ 4/25 10:00 | UNSTABLE DATA COMMUNICATION, CAPACITY SHORTAGE | WIMAX | 5 MILLION YEN |
| 2 | HIBIYA | EAST LONGITUDE: 139.8° NORTH LATITUDE: 35.7° | RESIDENTIAL AREA | 9 BUILDINGS/km$^2$ | 25m | 5m$^2$ | 2 STATIONS/km$^2$ | 4,000 PEOPLE/km$^2$ | 2007/ 6/4 21:00 | DEAD ZONE | W-CDMA | 14 MILLION YEN |
| ⋮ | ⋮ | ⋮ | ⋮ | ⋮ | ⋮ | ⋮ | ⋮ | ⋮ | ⋮ | ⋮ | ⋮ | ⋮ |

US 8,775,461 B2

CASE SEARCH SYSTEM, CASE DATABASE, CASE SEARCH APPARATUS, CASE SEARCH METHOD, AND PROGRAM

This application is based upon and claims the benefit of priority from Japanese patent application No. 2008-121737, filed on May 8, 2008, the disclosure of which is incorporated in its entirety by reference.

BACKGROUND

1. Technical Field

Aspects of the present invention relate to a case search system, a case database, a case search apparatus, a case search method and a program therefor, and more specifically, to a case search system for searching for a case of a previously designed network that can serve as a reference in the design or operation of a wireless network.

2. Description of the Related Art

Examples of conventional case search systems for network design and operation according to the related art are described in Japanese Patent Laid-Open No. 2005-269238 (Hereinafter, "Patent Document 1"), Japanese Patent Laid-Open No. 08-044641 (Hereinafter, "Patent Document 2") and Japanese Patent Laid-Open No. 2003-114911 (Hereinafter, "Patent document 3"). Fault analysis is one of the primary tasks performed in network operations. Patent Document 1 describes that at least fault points, fault observation results (or fault phenomena), points of cause, and frequency are registered in a database. The document further describes performing a search among cases of previously designed networks using a fault point and a fault observation result as search keys such that the causes of the fault are presumed. Therefore, cases of network faults are effectively utilized.

Patent Document 2 describes search of history information of network faults accumulated in a fault history database using an error code which is output at the time of a network fault as a key. The error code is an identifier issued by a computer system when a network fault has occurred and is supposed to indicate a point of the fault or a fault observation result as in Patent Document 1. This can contribute to prompt recovery from the fault in a computer network.

Patent Document 3 describes that in equipment design for a mobile communication system, multiple types of parameters, such as radiowave quality and operation quality, are obtained and threshold values corresponding to such parameters are established. And, an advice table that shows measures to be taken when quality has degraded below such a threshold is prepared. When actual quality has degraded, a way of addressing the degradation is retrieved from the advice table, using the degraded quality as a key and output. According to this technique, it is possible to optimize the parameters in the equipment design for a mobile communication system.

Patent Documents 1-3 all disclose a system or method for searching for a case which can be used as a reference in design or operation, from among past cases or expected typical model cases. And Patent Documents 1-3 all utilize information about an observation result, such as the point of a failure, the phenomenon of a fault itself, or ongoing quality degradation, as a key for search. Patent Documents 1-3 thus enable retrieval of a case of a previous network design having a similar phenomenon or fault that can serve as a reference for a subject matter under consideration.

As mentioned above, the techniques described in Patent Documents 1-3 use a fault observation result, such as a fault point or quality degradation, as a search key. In the design and operation of a wireless network, however, there is a problem that a case which does not serve as a reference may be searched just because it has a matching characteristic of a fault point or fault observation result. Or conversely, there is another problem that a case which serves as a reference cannot be searched only because it does not have a matching characteristic of a fault observation result.

SUMMARY

Embodiments of the present invention overcome the above disadvantages and also overcome other disadvantages not described above. Indeed, the present invention is not required to overcome the disadvantages described above and certain embodiments of the present invention may not overcome any of the problems described above.

An aspect of certain embodiments of the present invention is to provide a case search system, case search method, and program for solving the above-mentioned problems and enabling retrieval of a reference case with high accuracy.

Another aspect of certain embodiments of the present invention concerns a case search system for searching for a case that serves as a reference in a design or operation of a wireless network. The case search system includes a case database in which, for a case of design or operation of a wireless network, environment information that determines environmental characteristics of a wireless network in an area associated with the case is registered, and a case search unit that searches the case database for a case which serves as a reference using, as a search key, environment information that determines environmental characteristics of a wireless network in a target area which is a subject matter of the design or operation of the wireless network Yet another aspect of certain embodiments of the present invention concerns a case database system for use in a case search system for searching for a case that serves as a reference in a design or operation of a wireless network. The case database system includes a database containing environment information that determines environmental characteristics of a wireless network in an area associated with the case. The database responds to a query, using the environment information as a search key, for the case concerning a design or operation of a wireless network.

Still another aspect of certain embodiments of the present invention concerns a case search apparatus in a case search system for searching for a case that serves as a reference in design or operation of a wireless network. The case search apparatus includes a subject matter input unit that inputs information on the subject matter including at least the environment information of a wireless network in the target area as the subject matter, a search key specifying unit that specifies an item used as the search key from among the environment information of a wireless network in the target area as the subject matter, a similarity determination criteria accumulating unit that stores a criterion value for determining an effective range of the search key, and a search key range deriving unit that derives the effective range of the search key specified by the search key specifying unit based on the criterion value stored in the similarity determination criteria accumulating unit that corresponds to the search key. The case search apparatus retrieves, from the case database, the case for which a value of a same item as the search key among the environment information is within the effective range of the search key derived by the search key range deriving unit.

Yet another aspect of certain embodiments of the present invention concerns a case search method of searching for a case that serves as a reference in a design or operation of a wireless network. The method includes a case search operation including searching a case database for a case that serves as a reference using, as a search key, environment information of a wireless network in an area which is a subject matter of a design or operation of a wireless network in which, for a case of design or operation of a wireless network, the environment information that determines characteristics of a wireless network in an area associated with the case is registered in the case database.

Still another aspect of certain embodiments of the present invention concerns a computer readable tangible memory containing a program of instructions for enabling a computer, serving as a case search system for searching for a case that serves as a reference in a design or operation of a wireless network, wherein the program of instructions when executed by a processor, includes searching a case database for a case that serves as a reference using, as a search key, environment information of a wireless network in an area which is a subject matter of the design or operation of a wireless network in which, for a case of design or operation of a wireless network, the environment information that determines characteristics of a wireless network in an area associated with the case is registered in the case database.

According to certain embodiments of the present invention, an advantage of the ability to retrieve a reference case with high accuracy is provided.

BRIEF DESCRIPTION OF THE DRAWINGS

Aspects of embodiments of the present invention will become more apparent by describing in detail embodiments thereof with reference to the accompanying drawings, in which:

FIG. 4 shows a specific example of information maintained in a similarity determination criteria accumulating unit according to the second embodiment of the present invention.

FIG. 5 shows a specific example of information input from a subject matter input unit according to the second embodiment of the present invention.

FIG. 6 shows a specific example of information maintained in a case database according to the second embodiment of the present invention.

DETAILED DESCRIPTION OF EMBODIMENTS

Figure 1:
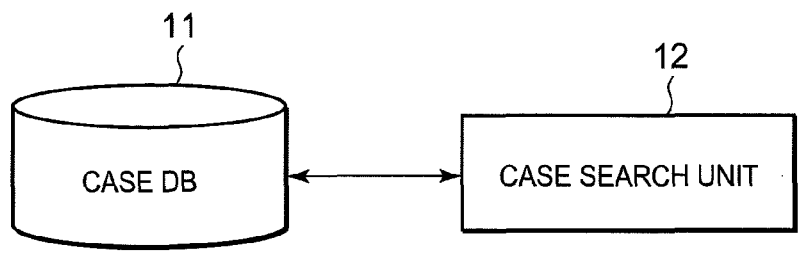
FIG. 1 is a schematic block diagram of a case search system according to a first embodiment of the present invention.

Embodiments of the present invention are described with reference to the drawings. FIG. 1 is a schematic block diagram of a case search system according to the first embodiment of the present invention.

The characteristics of a wireless network being designed and operated depend on characteristics of the environment in an area in which the network is designed and operated. Therefore, the cause of a phenomenon or the way for solving the fault may differ when environmental characteristics are different even if the point of fault or fault observation result is the same.

For example, a fault of formation of a dead zone with insufficient quality of reception may have been caused by the effect of construction of a new building if the fault is in a metropolitan area. However, if the fault is in a mountainous area, it may have been caused by a change in the radiowave environment resulting from a change in vegetation. And also, it may have been caused by manifestation of a dead zone after a new highway was constructed to allow users to go into areas which had been inaccessible. Thus, not only information about a fault observation result itself but position information, geographic name, or land use classification, which is environment information on a target area, can serve as an important factor in the search for a reference case.

Also, in implementation of such a design for renewing wireless equipment of an existing base station to increase its communication capacity, radiowave propagation characteristics in the target area often significantly affect the degree of performance improvement resulting from the equipment renewal. As a specific example, when communication capacity is to be increased using Multi Input Multi Output (MIMO) technology, its effect strongly depends on a radiowave path between the base station and a terminal. Therefore, building construction density, building height distribution or the like, which are environment information of the target area, act as important factors that determine characteristics. For such a design, even a case of past implementation of a measure for increasing communication capacity or a case of a typical model may not serve as a reference at all, if it has a different building construction density or building height distribution. When a case that cannot be a reference is retrieved, a user would waste time examining its details, which is inefficient.

Also, when considering a measure for resolving shortage of communication capacity, one may make such a judgment of whether the number of base stations should be increased in the same system or whether a new system should be introduced. When one makes a reference to cases that were implemented in the past for such judgment, if he/she searches for a case with an observation result of communication capacity shortage itself as a search key, a case of an area having the number of wireless base stations or population density totally different from those of the target area can be retrieved. Because effect of capacity increase resulting from increase of stations or introduction of a new system varies as the number of existing wireless base stations or population density differs, such a case often does not serve as a reference for the subject matter under consideration. If such a case is retrieved, the user would waste time examining its details as in the example above, which is inefficient. On the other hand, a case of existing design or operation in an area that is in the vicinity of the target area and has a similar number of wireless base stations or population density can sufficiently serve as a reference even if it is not a case of a measure for communication capacity shortage.

As described above, when a characteristic of an observation result itself, such as a fault point, radiowave quality, or operation quality, is used as a search key in searching for a case for use as a reference in design or operation of a wireless network, like the techniques described in Patent Documents 1-3, there is a problem of the inability to find a case that can sufficiently serve as a reference for design or operation.

The case search system shown in FIG. 1 is a case search system for searching for a case that serves as a reference for the design or operation of a wireless network. The case search system includes a case database (DB) 11 in which, for a case of design or operation of a wireless network, at least environment information that determines characteristics of a wireless network in an area associated with the case is registered. The case search system also includes a case search unit 12 that retrieves a case that can serve as a reference from the case database 11 using environment information that determines characteristics of a wireless network in a target area as the subject matter of the wireless network design or operation as a search key.

Since the case search unit 12 thus uses as a search key environment information on the area as the subject matter, it can find a case that has similar environment information to that of the subject matter area, that is, a case having similar wireless network characteristics, in the case database 11, and therefore can find a reference case with high accuracy.

Hereinafter, a second embodiment of the present invention will be described with reference to drawings.

Figure 2:
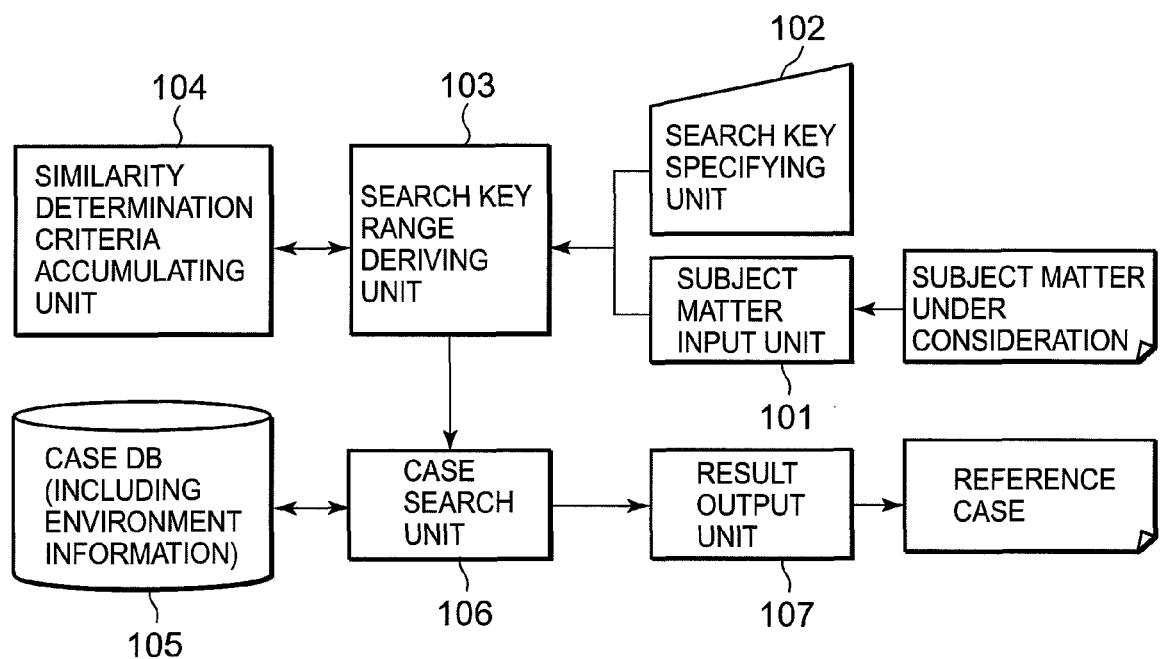
FIG. 2 shows a configuration of a case search system according to a second embodiment of the present invention.

FIG. 2 shows a configuration of the case search system according to the second embodiment of the present invention. Referring to FIG. 2, the case search system according to the second embodiment of the present invention includes a subject matter input unit 101, a search key specifying unit 102, a search key range deriving unit 103, a similarity determination criteria accumulating unit 104, a case database (DB) 105, a case search unit 106, and a result output unit 107.

The subject matter input unit 101 inputs a subject matter of design or operation (e.g., fault handling) implementation. The search key specifying unit 102 specifies a search key for use in case search for obtaining information that serves as a reference for a subject matter input from the subject matter input unit 101. The search key range deriving unit 103 derives an effective range of a search key specified by the search key specifying unit 102. The similarity determination criteria accumulating unit 104 stores criterion values for determining the effective range of search keys.

The case database 105 is a database that stores cases of past implementation of design or operation, cases of typical models, or cases of simulation, which include environment information serving as a factor that determines the characteristics of a wireless network as attribute information. The case search unit 106 retrieves from the case database 105 a case for which the value of the same item as a search key specified by the search key specifying unit 102 is within the effective range of the search key derived by the search key range deriving unit 103. The result output unit 107 outputs a case resulting from search performed by the case search unit 106.

Figure 3:
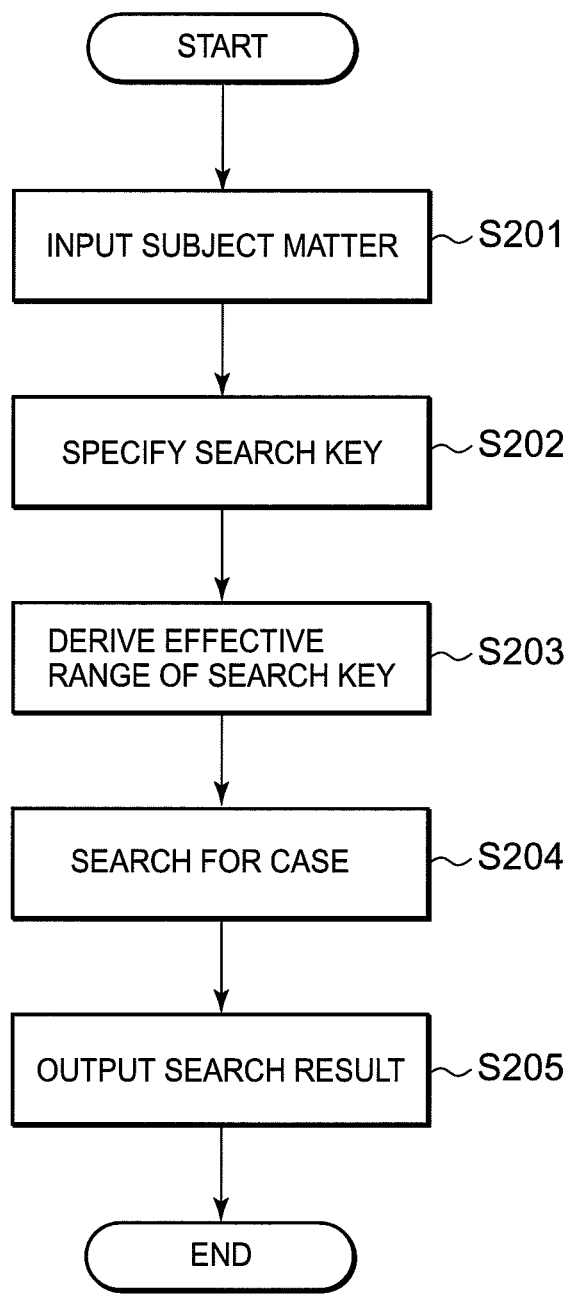
FIG. 3 is a flowchart showing operations of the case search system according to the second embodiment of the present invention.
Figure 7:
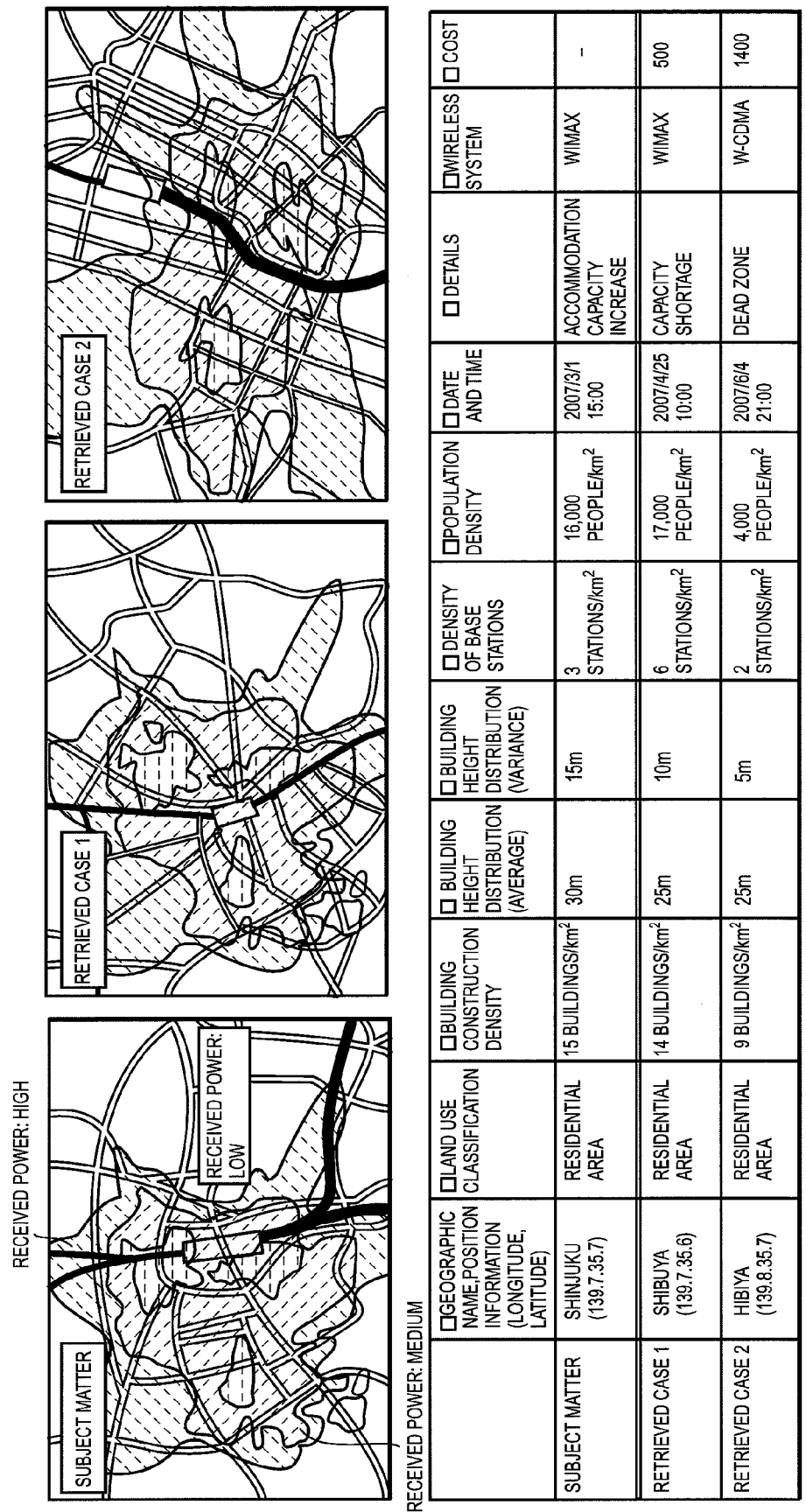
FIG. 7 shows a specific example of a screen image output by a result output unit according to the second embodiment of the present invention.

Next, operations of the case search system according to the second embodiment of the present invention will be described in detail with reference to FIGS. 2-7. FIG. 3 is a flowchart showing the operations of the case search system according to the second embodiment of the present invention. FIG. 4 shows a specific example of information maintained in the similarity determination criteria accumulating unit 104 shown in FIG. 2. FIG. 5 shows a specific example of information input from the subject matter input unit 101 shown in FIG. 2. FIG. 6 shows a specific example of information maintained in the case database 105 shown in FIG. 2. FIG. 7 shows a specific example of a screen image output by the result output unit 107 shown in FIG. 2.

As shown in FIG. 3, information on a subject matter as the target of design and operation of a wireless network is first input by a user via the subject matter input unit 101 (step S201). The information on the subject matter input at this step includes environment information relating to the subject matter or details of design and operation, as shown in FIG. 5, for example. These environment information or information about design and operation details is managed being associated with a date and time of consideration or a data and time of the result of consideration being actually applied in the field.

Examples of environment information may include geographic name, position information on a representative point in the area, land use classification, building construction density, building height distribution, density of existing base stations, population density and so forth. Examples of design details may include the purpose of design, examples of which include increase of base stations, increase of capacity, expansion of coverage (or a coverage area), change to handover parameters, adjustment of transmission power, adjustment of antenna directivity and the like. Examples of operation details may include fault point, fault phenomenon, performance information and so forth. A fault point may be a particular base station or a place. Examples of fault phenomena may include Key Performance Indicator (KPI) degradation, formation of a dead zone (or coverage shortage), occurrence of congestion, capacity shortage, throughput degradation, failure of handover, disconnection of communication or a telephone call and so on. Examples of performance information may include accommodation capacity, throughput, lost-call rate, and the like.

Next, to search for a case that can be used as a reference in design or operation of the input subject matter, an item for use as a key for the search is specified by the user via the search key specifying unit 102 (step S202). As this search key, the user can specify environment information that determines the characteristics of a wireless network, such as geographic name, position information, land use classification, building construction density, building height distribution, density of existing wireless base stations, or population density, which are shown in FIG. 5. In addition to the environment information shown in FIG. 5, the user may also include additional information, such as details of design or operation, the type of a wireless system to be designed or operated, or cost that can be invested for design or operation, as a search key. The search key specified at step S202 may be a single key or a combination of multiple keys.

Next, the search key range deriving unit 103 derives the effective range of the search key specified at step S202 based on information accumulated in the similarity determination criteria accumulating unit 104 (step S203). In the similarity determination criteria accumulating unit 104, a criterion value is stored for each search key as shown in FIG. 4, for example. And, for the value of a search key specified at step S202, if the value of the same item as that of the search key of a case in the case database 105 is within the criterion value range, that case is extracted as a reference case. By way of example, when building construction density is specified as a search key and the building construction density of the input subject matter is 15 buildings/km$^2$, because the criterion value of building construction density is 5 buildings/km$^2$ from reference to FIG. 4, the effective range of building construction density is derived as: from 10(=15−5) buildings/km$^2$ to 20(=15+5) buildings/km$^2$.

Next, the case search unit 106 retrieves from the case database 105 a case that can serve as a reference for design or operation of the subject matter which was input at step S201 (step S204). The case search unit 106 extracts any case for which the value of the same item as the search key specified at step S202 is within the effective range derived at step S203. As shown in FIG. 6, items of each case registered in the case database 105 may include ones similar to the items of a search key described above using FIG. 5. As to cost, which is an example of items in FIG. 6, a result of estimating a handling cost which was actually required in a past case or a handling cost that will be required for implementation, rather than an investable cost, is registered in the case database 105.

Taking the subject matter shown in FIG. 5 as an example, a case retrieved from the case database 105 will be described. Assuming that building construction density is specified as a search key at step S202 and the effective range of the search key (i.e., building construction density) is determined based on the criterion value of FIG. 4 at step S203, the range is 10 to 20 buildings/km² as mentioned above. At step S204, the case search unit 106 extracts any case that falls within this range from the case database 105. In the example of the case database 105 shown in FIG. 6, case No. 1 has a building construction density of 14 buildings/km², which falls within the range, and thus is extracted. On the other hand, case No. 2 has a building construction density of 9 buildings/km², which is outside the range, and thus is not extracted.

Consequently, at step S205, which is discussed later, case No. 1 shown in FIG. 6 is listed as the result of search. Referring to this search result, it can be seen that while case No. 1 has environment information almost the same as that of the subject matter of FIG. 5, it has a density of existing base stations of 6 stations/km², namely twice that of the subject matter of FIG. 5, 3 stations/km². Thus, for accommodation capacity increase, which is the purpose of the subject matter of FIG. 5, increase to around 6 stations/km² can be considered as a candidate design change.

While only building construction density is used as the search key in the above example, multiple search keys may be used to perform a search. In such a case, the search keys may be combined by either "OR" condition or "AND" condition. The user may be allowed to specify which of "OR" or "AND" condition should be applied to use of multiple search keys.

As an example of multiple search keys being specified at step S202, a case where building construction density and average building height distribution are specified will be illustrated. The effective range of building construction density is 10 to 20 buildings/km² as mentioned above, and the effective range of the average of building height distribution is derived as: 25(=30−5) m to 35(30+5) m, assuming that the example of FIG. 5 is the subject matter and the criterion value is 5 m, which is shown in FIG. 4. When a search is performed with multiple search keys combined by "OR" condition in such an example, any case that satisfies at least one of the conditions, i.e., building construction density being 10 to 20 buildings/km² and the average building height distribution being 25 to 35 m, is extracted from cases in the case database 105.

In the example of the case database 105 shown in FIG. 6, both cases No. 1 and No. 2 are extracted as their average building height distributions are within the effective range. Meanwhile, when a search is performed with the search keys combined by "AND" condition, the case No. 2 is not extracted because its building construction density is 9 buildings/km² and thus is not within the effective range of 10 to 20 buildings/km², and only the case No. 1 is extracted as its building construction density and average building height distribution are both within the effective ranges.

After a search process is performed by the case search unit 106, information on the subject matter as the target of design or operation that is input from the subject matter input unit 101 may be newly registered to the case database 105 and utilized as database in future search.

Next, the result retrieved at step S204 is output by the result output unit 107 (step S205). The result may be output in a table format or by displaying drawing information for the retrieved case using a computer display.

FIG. 7 shows an example of result output. In this example, information on the subject matter input at step S201 and information on the cases retrieved at step S204 are displayed as illustrations which superimpose radiowave condition over maps of areas of the subject matter and the retrieved cases and a table which shows various pieces of information about the subject matter and the retrieved cases. In the table, an item specified as a search key is checked so that the user can see which information was designated as a search key. Such indication allows the user to determine based on which search key a retrieved case was found in the displayed result, serving as useful information in reference.

Also, the above example assumes that two cases are retrieved at step S204 and shows the two search results on one screen at a time. With such display, the user can compare multiple cases retrieved to select a more useful case and display detailed information about the case for reference.

What is described above is the operation flow of the case search system according to the second embodiment of the present invention, where step S201 at which a subject matter is input by the subject matter input unit and step S205 at which a search result is output by the result output unit 107 may also be implemented via a communication network. When a subject matter can be input/output via a communication network, the case search system according to the second embodiment of the present invention can be utilized from a remote place.

As described above, in the case search system according to the second embodiment of the present invention, the case database 105 contains the geographic name or position information, land use classification, building construction density, building height distribution, density of existing wireless base stations, population density and the like of an area as the target of design or operation, which are environment information that determines characteristics of a wireless network, and such information is configured to be selectable as search keys. Therefore, the user of the present system can consult a case search result, such as the one shown in FIG. 7, and make reference to a case of design or fault handling that was implemented in the same area in the past or a case in a different area that has similar wireless network characteristics in the course of design or operation a subject matter.

As described above, in design or operation of a wireless network, more efficient handling becomes possible by referencing a case that has similar wireless network characteristics. The techniques described in Patent Documents 1-3 might retrieve a case that has totally different wireless network characteristics and does not serve as a reference because they search for only cases that have matching fault details or the like. On the other hand, the system according to the embodiments of the present invention is capable of detecting a reference case with high accuracy because it searches for a case having similar wireless network characteristics.

In addition, since the case search system according to the second embodiment of the present invention has the search key specifying unit 102 for specifying a search key, it can narrow down characteristics of cases that should be extracted as a reference and retrieve only reference cases that are more useful. Furthermore, since the case search system according to the second embodiment of the present invention has the search key range deriving unit 103 for deriving an effective range of a search key and the similarity determination criteria accumulating unit 104 in which criterion values for determining effective ranges of search keys are accumulated, the system can extract cases having similar characteristics with a latitude of a certain degree and increase cases that can serve as a reference.

Hereinafter, a third embodiment of the present invention will be described.

The configuration of the third embodiment of the present invention is the configuration of the first embodiment of the present invention shown in FIG. 1. In the case database 11, however, not only the environment information but also information of the fault observation result are registered. And, the case search unit uses information of the fault observation result, in addition to the environment information, as a search key.

The processing operation of the case search system (a case search apparatus) according to the embodiments of the present invention can be realized by causing a computer serving as a CPU (or a control unit) to read and execute a program stored in a storage medium, such as a ROM, a RAM, or a magnetic or optical storage medium.

The present invention is applicable to such applications as a reference case display apparatus for design and operation of a wireless network or a program for realizing such a reference case display apparatus with a computer.

While embodiments of the present invention have been described in detail above, it is contemplated that numerous modifications may be made to the above embodiments without departing from the spirit and scope of the present invention which is defined by the following claims.

What is claimed is:

1. A case search system for searching for a case that serves as a reference in a design or operation of a wireless network, the case search system comprising:
   an apparatus including a processor; and
   a case database which stores a plurality of cases of previous design or operation of wireless networks, and registers for at least one case among the plurality of cases, environment information that determines environmental characteristics of a wireless network in an area associated with the at least one case;
   wherein the processor comprising;
   a case search unit that searches the case database for a case among the plurality of cases which serves as a reference for design or operation of a current wireless network using, as a search key, environment information that determines environmental characteristics of the current wireless network in a target area which is a subject matter of the design or operation of the current wireless network,
   wherein the environmental information represents at least one parameter potentially affecting wireless communication characteristics,
   wherein the case search unit searches the case having the environmental information similar to that of the current wireless network in the target area,
   wherein in the case database, for the case of the design or operation of a wireless network, information of a fault observation result is registered in association with environment information, and
   wherein the case search unit searches the case database for a case which serves as a reference using both the information of fault observation result and the environment information as the search key.

2. The case search system according to claim 1, further comprising:
   a subject matter input unit that inputs information on the subject matter including at least the environment information of the current wireless network in the target area as the subject matter; and
   a search key specifying unit that specifies an item used as the search key from among the environment information of the current wireless network in the target area as the subject matter.

3. The case search system according to claim 2, further comprising:
   a similarity determination criteria accumulating unit that stores a criterion value for determining an effective range of the search key; and
   a search key range deriving unit that derives an effective range of the search key specified by the search key specifying unit based on the criterion value stored in the similarity determination criteria accumulating unit that corresponds to the search key,
   wherein the case search unit retrieves, from the case database, the case for which a value of an item the same as the search key among the environment information is within the effective range of the search key derived by the search key range deriving unit.

4. The case search system according to claim 2,
   wherein the information on the subject matter includes at least one of a date and time of implementing the design or operation, details of the design or operation, a type of a wireless system, and a cost required for the design or operation, in addition to the environment information of the current wireless network in the target area as the subject matter, and
   wherein the search key specifying unit permits the search key to be specified from among items other than the environment information included in the information on the subject matter.

5. The case search system according to claim 2, further comprising:
   a result output unit that outputs a search result from the case search unit,
   wherein the result output unit displays the search result so that the search key specified by the search key specifying unit is distinguishable.

6. The case search system according to claim 5,
   wherein, if the search result includes a plurality of cases, the result output unit simultaneously displays the plurality of cases on one screen.

7. The case search system according to claim 1,
   wherein the environment information includes at least one of position information, geographic name, land use classification, building construction density, building height distribution, density of existing wireless base stations, and population density information of the area.

8. The case search system according to claim 1, wherein the case search unit searches for the case by comparing environment information of a wireless network in an area associated with the first case with the environment information of the current wireless network in the target area.

9. A case database system for use in a case search system for searching for a case that serves as a reference in a design or operation of a wireless network, the case database system comprising:
   an apparatus including a processor; and
   a computer-implemented database containing environment information concerning environmental characteristics of previously designed or operated wireless networks,
   wherein the processor comprising:
   a receiving unit to receive a query containing a requested environmental characteristic, and to use the requested environmental characteristic in a target area of a current wireless network as a search key to locate one or more cases of previously designed or operated wireless networks having an environmental characteristic in an area associated with the one or more cases matching the requested environmental characteristic in the target area of the current wireless network, and an outputting unit to output information recorded in the database concerning the located cases, wherein the environmental information represents at least one parameter potentially affecting wireless communication characteristics, wherein the case having the environmental information similar to that of the current wireless network in the target area is searched, wherein in the case database, for the case of the design or operation of a wireless network, information of a fault observation result is registered in association with environment information, and wherein the case search unit searches the case database for a case which serves as a reference using both the information of fault observation result and the environment information as the search key.

10. A case search apparatus in a case search system for searching for a case that serves as a reference in design or operation of a wireless network, the case search apparatus comprising:

a processor, wherein the processor comprising:

a subject matter input unit that inputs information on the subject matter including at least the environment information of a current wireless network in the target area as the subject matter;

a search key specifying unit that specifies an item used as the search key from among the environment information of the current wireless network in the target area as the subject matter;

a similarity determination criteria accumulating unit that stores a criterion value for determining an effective range of the search key; and a search key range deriving unit that derives the effective range of the search key specified by the search key specifying unit based on the criterion value stored in the similarity determination criteria accumulating unit that corresponds to the search key, wherein the case search apparatus retrieves, from a case database, a previous case for which a value of a same item as the search key among the environment information in an area associated with the previous case is within the effective range of the search key derived by the search key range deriving unit, wherein the environmental information represents at least one parameter potentially affecting wireless communication characteristics, wherein the case having the environmental information similar to that of the current wireless network in the target area is searched, wherein in the case database, for the case of the design or operation of a wireless network, information of a fault observation result is registered in association with environment information, and wherein the case search unit searches the case database for a case which serves as a reference using both the information of fault observation result and the environment information as the search key.

11. A computer-implemented case search method of searching for a case that serves as a reference in a design or operation of a wireless network, the computer comprising: a processor, the processor performing:

a case search operation comprising searching a case database for a case that serves as a reference for design or operation of a current wireless network using, as a search key, environment information of the current wireless network in a target area which is a subject matter of a design or operation of the current wireless network in which, the environment information that determines characteristics of a wireless network in an area associated with the previous case is registered in the case database, wherein the environmental information represents at least one parameter potentially affecting wireless communication characteristics, wherein the case having the environmental information similar to that of the current wireless network in the target area is searched, wherein in the case database, for the case of the design or operation of a wireless network, information of a fault observation result is registered in association with environment information, and wherein the case search unit searches the case database for a case which serves as a reference using both the information of fault observation result and the environment information as the search key.

12. The case search method according to claim 11, further comprising:

a subject matter input operation comprising inputting information on the subject matter including the environment information of the current wireless network in the target area as the subject matter; and a search key specifying operation comprising specifying an item used as the search key from among the environment information of the current wireless network in the target area as the subject matter.

13. The case search method according to claim 12, further comprising:

a search key range deriving operation comprising deriving an effective range of the search key specified by the search key specifying operation based on a criterion value corresponding to the search key specified by the search key specifying operation, wherein the case search operation retrieves, from the case database, a case for which a value of a same item as the search key among the environment information is within the effective range of the search key derived at the search key range deriving step.

14. The case search method according to claim 12, wherein the information on the subject matter includes at least one of a date and time of implementing the design or operation, details of the design or operation, a type of wireless system, and a cost required for the design or operation, in addition to the environment information of the current wireless network in the target area as the subject matter, and wherein the search key specifying operation permits the search key to be specified from among items other than the environment information included in the information on the subject matter.

15. The case search method according to claim 12, further comprising:

a result output operation comprising outputting a search result from the case search operation, wherein the result output operation displays the search result so that the search key specified at the search key specifying operation is distinguishable.

16. The case search method according to claim 15, wherein, when the search result includes a plurality of cases, the result output operation simultaneously displays the plurality of cases on one screen.

17. The case search method according to any of claim 11, wherein the environment information includes at least one of position information, geographic name, land use classification, building construction density, building height distribution, density of existing wireless base stations, and population density information of the area.

18. A non-transitory computer readable tangible memory containing a program of instructions for enabling a computer, serving as a case search system for searching for a case that serves as a reference in a design or operation of a wireless network, wherein the program of instructions when executed by a processor, comprising:

searching a case database for a previous case that serves as a reference for design or operation of a current wireless network, using, as a search key, environment information of the current wireless network in a target area which is a subject matter of the design or operation of the current wireless network in the target area associated with the case is registered in the case database, wherein the environmental information represents at least one parameter potentially affecting wireless communication characteristics, wherein the case having the environmental information similar to that of the current wireless network in the target area is searched, wherein in the case database, for the case of the design or operation of a wireless network, information of a fault observation result is registered in association with environment information, and wherein the case search unit searches the case database for a case which serves as a reference using both the information of fault observation result and the environment information as the search key.

* * * * *